United States Patent [19]

Akaiwa

[11] Patent Number: 4,651,107
[45] Date of Patent: Mar. 17, 1987

[54] DEMODULATOR FOR DIGITAL FM SIGNALS

[75] Inventor: Yoshihiko Akaiwa, Tokyo, Japan

[73] Assignee: NEC Corporation, Japan

[21] Appl. No.: 687,575

[22] Filed: Dec. 28, 1984

[30] Foreign Application Priority Data

Jan. 11, 1984 [JP] Japan .................................. 59-2901
Feb. 24, 1984 [JP] Japan .................................. 59-33465

[51] Int. Cl.⁴ ............................................. H03D 3/00
[52] U.S. Cl. ..................................... 329/50; 329/124; 329/126; 455/214; 375/82
[58] Field of Search ................. 329/50, 122, 124, 105, 329/110, 104, 126; 455/214, 337; 375/80, 81, 82, 94, 88

[56] References Cited

U.S. PATENT DOCUMENTS

4,322,851  3/1982  Vance ................................ 375/80 X
4,462,107  7/1984  Vance ................................... 375/88
4,521,892  6/1985  Vance et al. ..................... 329/124 X Primary Examiner—Siegfried H. Grimm
Attorney, Agent, or Firm—Laff, Whitesel, Conte & Saret

[57] ABSTRACT

An FM demodulator for demodulating a signal which has been frequency modulated by a digital signal. The FM demodulator includes mixers, low-pass filters and limiters. All the circuit elements succeeding the mixers are operable in the baseband, while all the circuit elements succeeding the limiters are comprised of digital circuit elements. The FM demodulator with such a construction is suitable for an integrated circuit.

10 Claims, 10 Drawing Figures

DEMODULATOR FOR DIGITAL FM SIGNALS

BACKGROUND OF THE INVENTION

The present invention relates to an FM demodulator for demodulating a signal which has been frequency modulated by a digital signal and, more particularly, to an FM demodulator suitable for an integrated circuit.

An FM demodulator in an integrated circuit configuration may be implemented by a so-called direct conversion system. The system is such that a received signal is directly frequency converted to a baseband signal to allow filtering and other kinds of processing to be achieved in the baseband. Signal processing in the baseband may be accomplished by a well known method which employs differentiation and multiplication. While the differentiation and multiplication scheme is capable of demodulating even a signal which has been modulated by an analog signal, it is difficult to be implemented by an integrated circuit due to the need for an automatic gain control circuit and an analog multiplier.

An example of prior art FM demodulators of the type using the direct conversion system is disclosed in U.K. Patent Application GB No. 2 106 359A. The disclosed FM demodulator, as shown in FIG. 11a of the drawings, has a demodulator construction furnished with digital circuit portions and an analog circuit portion which comprises a switch, resistors, a low-pass filter and other elements. The problem encountered with such a prior art demodulator is that the analog circuit portion is not suitable for an integrated circuit implementation and minute pulse noise (spike noise) appears in an output of the demodulator due to a delay difference between two inputs to a second Exclusive-OR gate (15).

SUMMARY OF THE INVENTION

It is therefore an object of the present invention to provide an FM demodulator which is free from the drawbacks discussed above and feasible for an integrated circuit.

It is another object of the present invention to provide a generally improved FM demodulator.

In one aspect of the present invention, there is provided an FM demodulator comprising a frequency down converter for converting a received frequency-modulated signal into 2N (where N is a positive integer) baseband signals which are different in phase from each other, by a use of local oscillator signals having a frequency which is substantially equal to a center frequency of the modulated signal, a limiter for digitizing the 2N baseband signals to provide 2N digital signals of two logical levels, a first Exclusive-OR gate for providing Exclusive-OR of the 2N digital signals to produce a first gate signal, a reference signal generator for generating a reference signal by, assuming that where the 2N digital signals are arranged in a modulo 180° order in phase every two signals of the 2N signals belong to a first signal group and the others to a second signal group, selecting one of logical "1" and "0" levels every time a state of any of the signals in the first signal group is changed and selecting the other logical level every time a state of any of the signals in the second signal group is changed, a second Exclusive-OR gate responsive to the reference signal and the first gate signal of the first Exclusive-OR gate to produce a second gate signal, a pulse generator responsive to one of the second gate signal and the reference signal as an input signal for generating a pulse signal in response to a state transition of the input signal and before or after a time of the state transition, and a D-type flip-flop responsive to the pulse signal as a clock pulse input and the second gate signal as a signal input, an output of the D-type flip-flop being delivered as a demodulated output signal.

In another aspect of the present invention, there is provided an FM demodulator comprising a frequency down converter for converting a received frequency-modulated signal into two baseband signals which are different in phase from each other, by a use of local oscillator signals having a frequency which is substantially equal to a center frequency of the modulated signal, a limiter for digitizing the two baseband signals to provide two digital signals of two logical levels, a first Exclusive-OR gate for providing Exclusive-OR of the two digital signals to produce a first gate signal, a reference signal generator responsive to the two digital signals for generating a reference signal by selecting one of logical "1" and "0" levels every time a state of one of the two digital signals is changed and selecting the other logical level every time a state of the other digital signal is changed, a second Exclusive-OR gate responsive to the reference signal and the first gate signal to produce a second gate signal, a pulse generator responsive to one of the second gate signal and the reference signal as an input signal for generating a pulse signal in response to a state transition of the input signal and before or after a time of the state transition, and a D-type flip-flop responsive to the pulse signal as a clock pulse input and the second gate signal as a signal input, an output of the D-type flip-flop being delivered as a demodulated output signal.

In another aspect of the present invention, there is provided an FM demodulator comprising a frequency down converter for converting a received frequency-modulated signal into 4N (where N is a positive integer) baseband signals which are different in phase from each other, by a use of local oscillator signals having a frequency which is substantially equal to a center frequency of the modulated signal, a limiter for digitizing the 4N baseband signals to provide 4N digital signals of two logical levels, a first Exclusive-OR gate for producing a first gate signal when applied with, assuming that where the 4N digital signals are arranged in a modulo 180° order in phase and every two signals of the 4N digital signals belong to a first signal group and the others to a second signal group, every two signals in the first signal group selected in the order of phase belong to a third signal group and the others to a fourth signal group, all the signals belonging to the first signal group, a second Exclusive-OR gate responsive to all the signals belonging to the second signal group to produce a second gate signal, a reference signal generator for generating a reference signal by selecting one of logical states of a digital signal every time a state of any of the signals in the third signal group is changed and selecting the other of the logical states every time a state of any of the signals in the fourth signal group is changed, a third Exclusive-OR gate responsive to the reference signal and the first gate signal, and a sampling circuit for sampling an output of the third Exclusive-OR gate every time a state of any of the signals in the second signal group is changed, an output of the sampling circuit being delivered as a demodulated output signal.

In another aspect of the present invention, there is provided an FM demodulator comprising a frequency down converter for converting a received frequency-modulated signal into four baseband signals which are different in phase from each other, by a use of local oscillator signals having a frequency which is substantially equal to a center frequency of the modulated signal, a limiter for digitizing the four baseband signals to provide four digital signals of two logical levels, a first Exclusive-OR gate for providing Exclusive-OR of the four digital signals to produce a first gate signal, a reference signal generator responsive to the four digital signals for generating a reference signal by selecting one of lolgical "1" and "0" levels every time states of two of the four digital signals are changed and selecting the other of the logical levels every time states of the other two digital signals are changed, a second Exclusive-OR gate responsive to the first gate signal and the reference signal to produce a second gate signal, and a sampling circuit for sampling the second gate signal to produce a demodulated output signal.

In another aspect of the present invention, there is provided an FM demodulator comprising a frequency down converter for converting a received frequency-modulated signal into four baseband signals which are different in phase from each other, by a use of local oscillator signals having a frequency which is substantially equal to a center frequency of the modulated signal, a limiter for digitizing the four baseband signals to provide four digital signals of two logical levels, a first Exclusive-OR gate for providing Exclusive-OR of two of the four digital signals to produce a first gate signal, a second Exclusive-OR gate for providing Exclusive-OR of the other two digital signals to produce a second gate signal, a reference signal generator responsive to the other two digital signals for generating a reference signal by selecting one of logical "1" and "0" levels every time a state of one of the other two digital signals is changed and selecting the other of the logical levels every time a state of the other one of the other two digital signals is changed, a third Exclusive-OR gate responsive to the reference signal and the second gate signal to produce a third gate signal, and a sampling circuit for sampling the third gate signal every time a state of the first gate signal is changed, to produce a demodulated output signal.

In accordance with the present invention, an FM demodulator for demodulating a signal which has been frequency modulated by a digital signal is disclosed. The FM demodulator includes mixers, low-pass filters and limiters. All the circuit elements succeeding the mixers are operable in the baseband, while all the circuit elements succeeding the limiters are comprised of digital circuit elements. The FM demodulator with such a construction is suitable for an integrated circuit.

The above and other objects, features and advantages of the present invention will become more apparent from the following detailed description taken with the accompanying drawings.

DESCRIPTION OF THE PREFERRED EMBODIMENTS

While the FM demodulator of the present invention is susceptible of numerous physical embodiments, depending upon the environment and requirements of use, substantial numbers of the herein shown and described embodiments have been made, tested and used, and all have performed in an eminently satisfactory manner.

Figure 1:
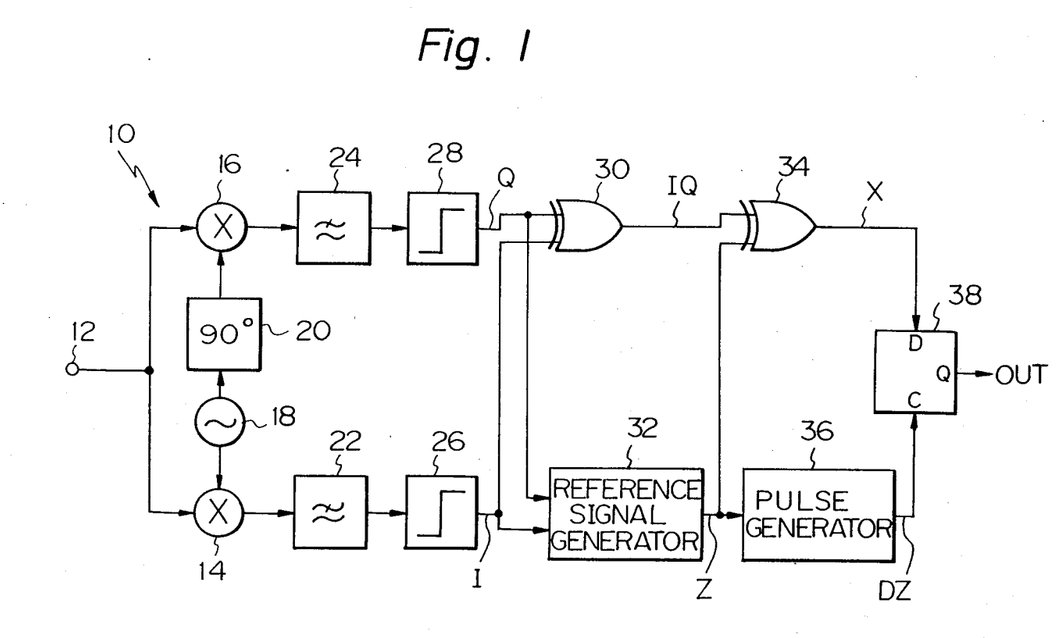
FIG. 1 is a block diagram of an FM demodulator embodying the present invention.

Referring to FIG. 1 of the drawings, an FM demodulator embodying the present invention is shown and generally designated by the reference numeral 10. A received signal which has undergone frequency modulation by a mark or space digital signal is applied to an input terminal 12 and routed therefrom to mixers 14 and 16. A local oscillator 18 produces an output whose frequency is substantially equal to the center frequency of the input signal. The oscillator output is applied on one hand to the mixer 14 and on the other hand to the mixer 16 via a 90° phase shifter 20 so that the mixers 14 and 16, using the local oscillation signals which are different in phase by 90°, frequency convert the received signal to the baseband signal. The mixer 14 is connected to a low-pass filter (LPF) 22 and the mixer 16 to a low-pass filter (LPF) 24. Each of the LPFs 22 and 24 functions to pick up only a baseband signal in a desired channel and to band-limit the noise. The baseband signals output from the low-pass filters 22 and 24 respectively are applied to limiters 26 and 28 which then produce digital signals I and Q, respectively. Since the phase difference between the modulated signal routed from the input terminal 12 to the mixer 16 and the output of the phase shifter 20 and the phase difference between the modulated signal routed to the mixer 14 and the output of the local oscillator 18 differs by 90°, the signals I and Q are also different in phase by 90° from each other. Exemplary waveforms of the signals I and Q are shown in FIG. 4, in which the solid lines show a case wherein the modulation signal is a mark and the phantom lines a case wherein the modulation signal is a space.

Figure 4:
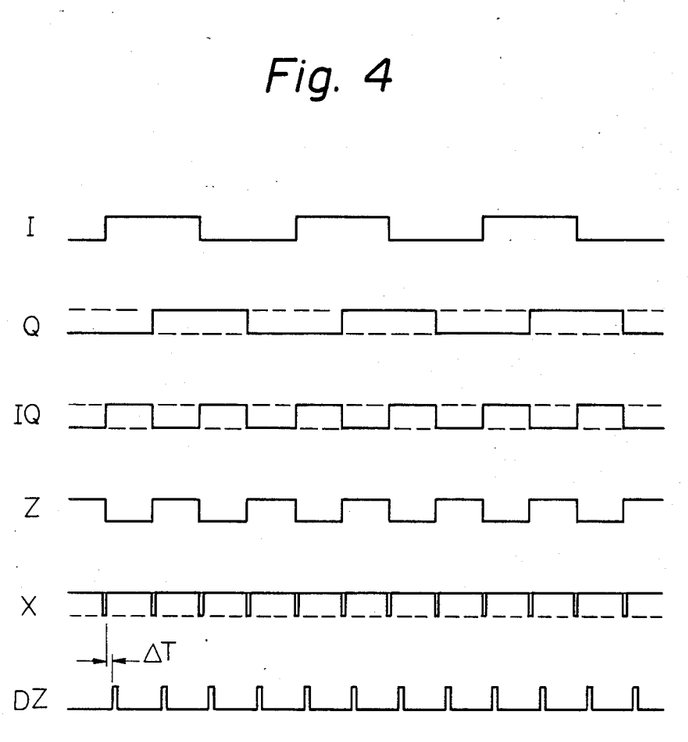
FIGS. 4 and 5 are timing charts representative of the operation of the FM demodulator shown in FIGS. 1-3.

The signals I and Q are coupled to an Exclusive-OR (Ex-OR) gate 30 which produces a signal IQ as shown in FIG. 4. At the same time, the signals I and Q are applied to a reference signal generator 32. As will be described later in detail, the reference signal generator 32 is constructed to generate a reference signal Z which shares the same period with the signals I and Q and, whether the modulation signal is a mark or a space, does not change its phase relative to the signal I or Q. The signal Z is routed to another Ex-OR gate 34 together with the signal IQ. As shown in FIG. 4, an output signal X of the EX-OR 34, except for its minute pulse portions, becomes logical "1 (solid line)" or "0 (phantom line)" level depending upon the modulation signal which is either a mark or a space, whereby frequency detection is accomplished. The minute pulse portion originates from some time difference in transition point between the two signals applied to the Ex-OR gate 34.

In accordance with the present invention, a D-type flip-flop 38 samples and holds the signal X using an output signal DZ of a pulse generator 36 as a clock signal, for the purose of removing the above-discussed minute pulse portions. The signal DZ is acceptable only if not generated while the signal X appears in minute pulse portions, that is, only if generated either before or after minute pulse portions of the signal X with respect to time, and may be generated by cascading delay circuits by way of example. The input signal to the delay and pulse generator 36 does not have to be the reference signal Z and may even be the signal IQ. This will readily be understood from the fact that a pulse generator, which will be described, is constructed to generate a pulse at a transition point of a signal, and that the transitions of the signals IQ and Z correspond in one-to-one relation to each other.

Figure 2:
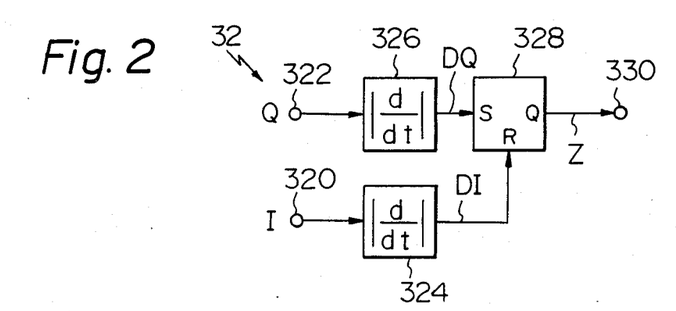
FIG. 2 is a block diagram of a reference signal generator included in the FM demodulator of FIG. 1.
Figure 5:
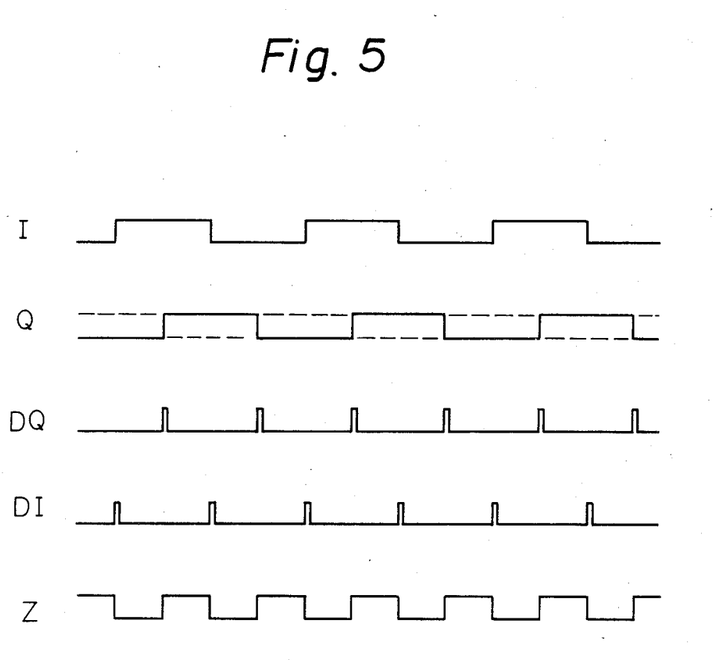

Referring to FIG. 2, a detailed construction of the reference signal generator 32 in accordance with the illustrative embodiment is shown. The signals I and Q respectively are applied to input terminals 320 and 322 and, therefrom, to pulse generators 324 and 326. As shown in FIG. 5, the pulse generators 324 and 326 produce pulse signals DI and DQ, respectively, each at transition points of the input signal I or Q. A set-reset flip-flop 328 is set by the pulse signal DQ and reset by the signal DI to produce the reference signal Z at an output terminal 330 thereof. The reference signal Z is dependent upon the transition time of the signals I and Q only and not upon whether the modulation signal is a mark or a space.

Figure 3:
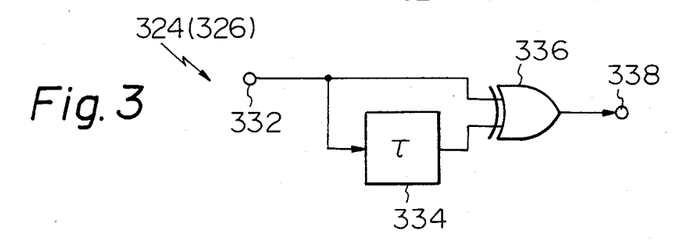
FIG. 3 is a circuit diagram showing a pulse generator included in the reference signal generaor of FIG. 2.

Each of the pulse generators 324 and 326 may be constructed as shown in FIG. 3 by way of example. In FIG. 3, the signal applied to an input terminal 332 is coupled to an Ex-OR gate 336 directly on one hand and via a delay circuit 334 on the other hand. Appearing at an output terminal 338, therefore, are pulses which are timed to transitions of the input signal.

In accordance with the embodiment described above, the phase difference between the signals I and Q is not limited to 90° which is most preferable and is free to choose insofar as it is not zero. This will easily be seen by, for example, drawing such waveforms as those shown in FIG. 4.

The phase difference between the signals I and Q may be provided by developing a phase difference in the modulated signal which is input to the two mixers 14 and 16, instead of developing it in the local oscillation signal as shown and described.

Furthermore, the signals Q and I coupled to the set and reset terminals of the flip-flop 328 may be replaced with each other. Any of such combinations of the signals Q and I is successful to provide a detected signal with marks and spaces appearing correctly or changed for each other. In the latter case, a circuit for inverting the data will be added to the illustrated arrangement.

Figure 6:
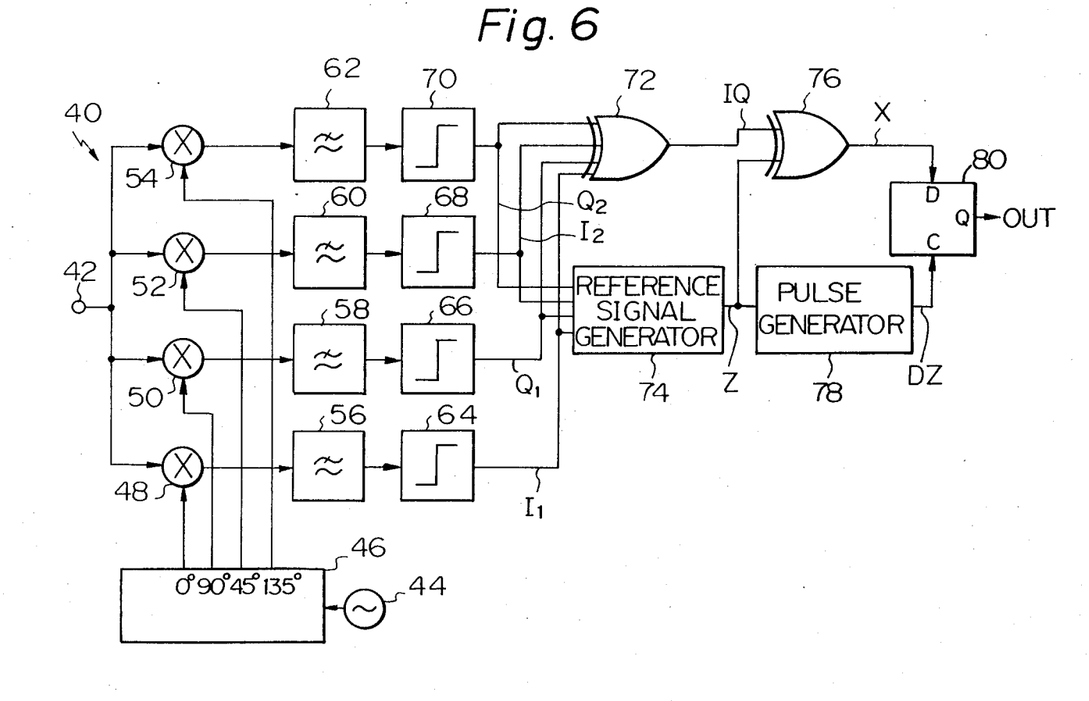
FIG. 6 is a block diagram showing another embodiment of the present invention.
Figure 7:
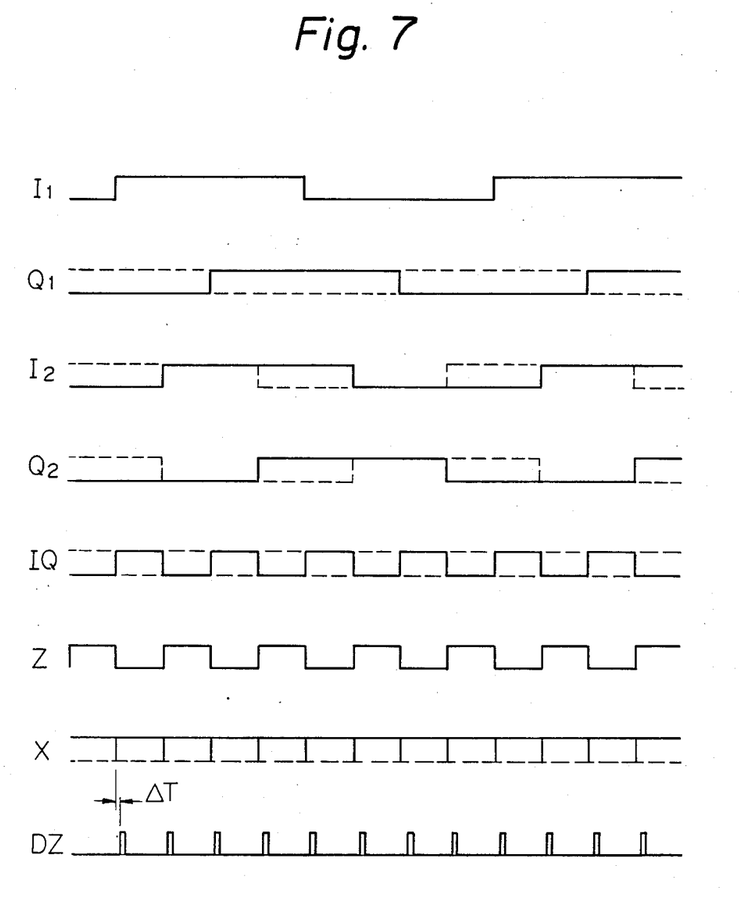
FIG. 7 is a timing chart representative of the operation of the FM demodulator shown in FIG. 6.

Referring to FIG. 6, an FM demodulator 40 in accordance with another embodiment of the present invention is shown. The frequency-modulated signal is applied to an input terminal 42 of the FM demodulator 40. A local oscillator 44 generates a signal whose frequency is substantially equal to the center frequency of the input modulated signal. The output of the local oscillator 44 is applied to a phase splitter 46 to be thereby provided with phase differences of 0°, 45°, 90°, and 135°. The four outputs of the phase splitter 46 respectively are fed to four mixers 48, 50, 52 and 54 as local oscillation signals, each of the mixers frequency converting the input modulated signal to the baseband signal on the basis of the associated local oscillation signal. The outputs of the mixers 48, 50, 52 and 54 respectively are passed through low-pass filters 56, 58, 60 and 62 and then through limiters 64, 66, 68 and 70 to become signals $I_1$, $Q_1$, $I_2$ and $Q_2$. These signals may have waveforms as shown in FIG. 7 by way of example. In FIG. 7, solid lines are associated with a mark and phantom lines with a space. The signals $I_1$, $Q_1$, $I_2$ and $Q_2$ are applied to an Ex-OR gate 72 which then produces an output signal IQ as shown in FIG. 7. The signal IQ is coupled to another Ex-OR gate 76 together with a reference signal Z which is generated by a reference signal generator 74. As shown in FIG. 7, an output signal X of the Ex-OR gate 76 becomes logical "1 (solid line)" level or "0 (phantom line)" level depending upon the modulation signal which is the mark or space except for minute pulse portions. A delay and pulse generator 78 and a D-type flip-flop 80 function in the same manner as those of the first embodiment.

Figure 8:
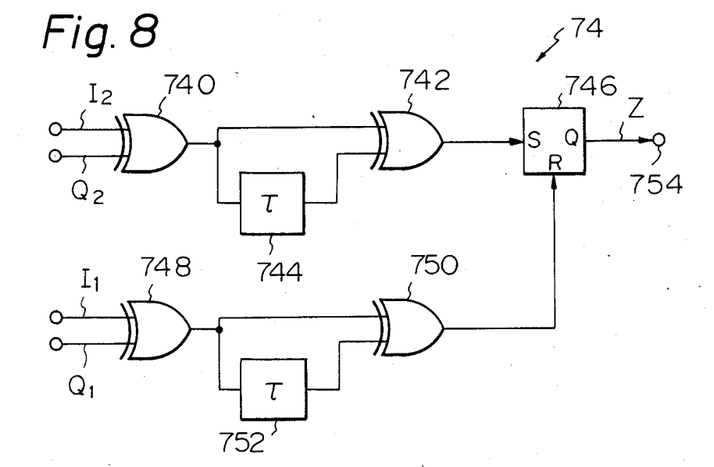
FIG. 8 is a circuit diagram showing a reference signal generator shown in FIG. 6.

The reference signal generator 74 in the illustrative embodiment may be implemented by the circuitry shown in FIG. 8. The operation of the circuitry of FIG. 8 will not need detailed description. Let it suffice to say that Ex-OR gates 740 and 742 and a delay circuit 744 cooperate to generate pulses at the leading edges and trailing edges of the signals $I_2$ and $Q_2$ to therby set a set-reset flip-flop 746, while Ex-Or gates 748 and 750 and a delay circuit 752 in cooperation generate pulses at the leading edges and trailing edges of the signals $I_1$ and $Q_1$ to thereby reset the flip-flop 746, the output Z appearing at an output terminal 754. Although more complicated in construction than the first embodiment, the second embodiment will prove particularly effective where the phase transition of the modulated signal is relatively insignificant, that is, where the modulation index is smaller.

Figure 9:
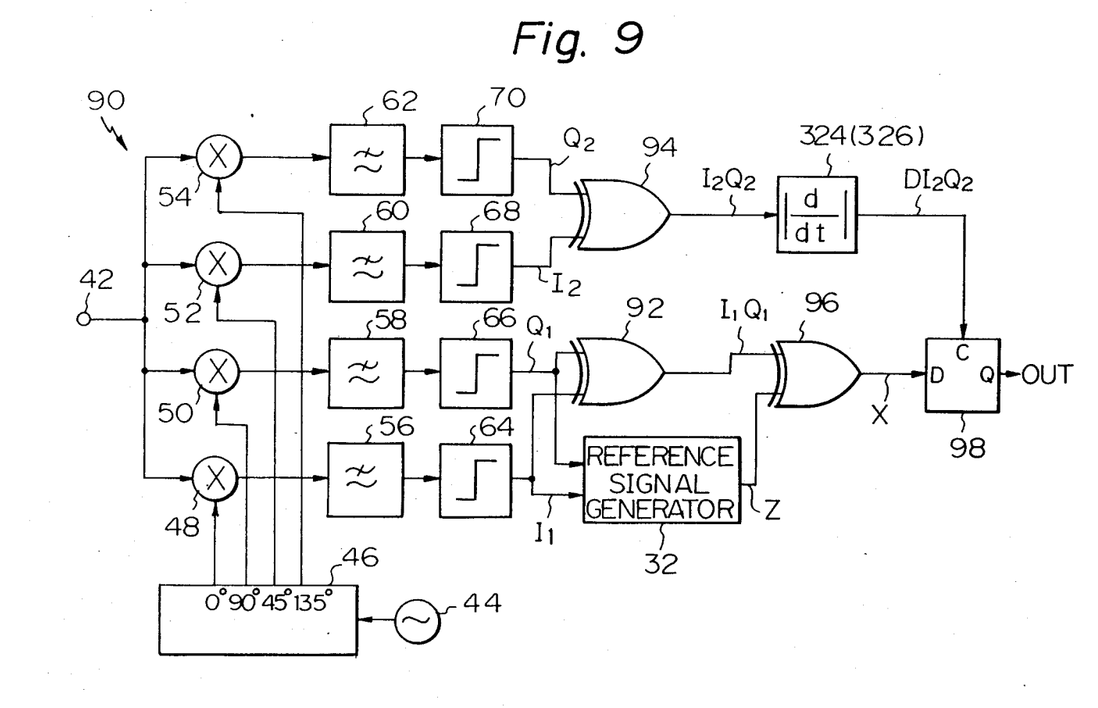
FIG. 9 is a block diagram showing still another embodiment of the present invention.
Figure 10:
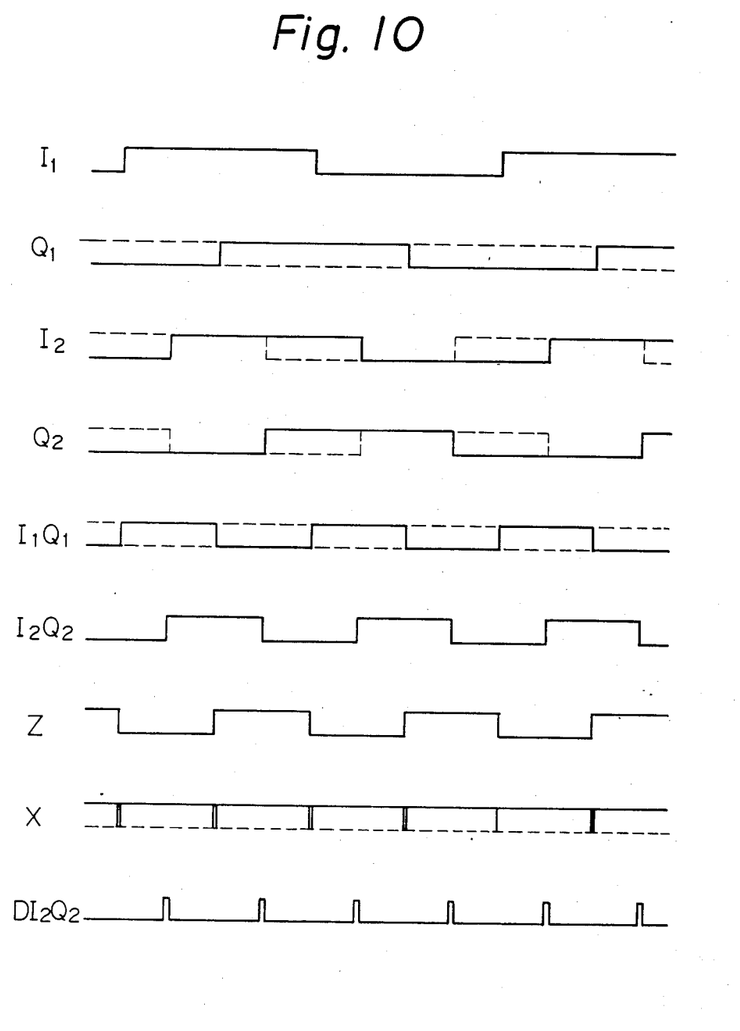
FIG. 10 is a timing chart demonstrating the operation of the FM demodulator shown in FIG. 9.

Referring to FIG. 9, still another embodiment of the present invention is shown. An FM demodulator, generally 90, is common to the FM demodulator 40 concerning the constructions and operations of the mixers 48, 50, 52 and 54, low-pass filters 56, 58, 60 and 62, limiters 64, 66, 68 and 70, phase splitter 46, and oscillator 44. In accordance with this particular embodiment, the digital outputs $I_1$, $Q_1$, $I_2$ and $Q_2$ have individual phase differences which correspond to those provided by the phase splitter 46 as shown in FIG. 10, in which solid lines show a case wherein the modulation signal is the mark and phantom lines a case wherein it is the space. The signals $I_1$ and $Q_1$ are applied to an Ex-Or gate 92 and the signals $I_2$ and $Q_2$ to another Ex-OR gate 94 whereby signals $I_1Q_1$ and $I_2Q_2$ are produced as shown in FIG. 10. At the same time, the signals $I_1$ and $Q_1$ are routed to the reference signal generator 32, which is constructed in the same way as in FIG. 2, to provide the reference signal Z. The reference signal Z and the signal $I_1Q_1$ are applied to an Ex-OR gate 96 which then produces an output signal X. As shown in FIG. 10, the signal X becomes logical "1 (solid line)" level or "0 (phantom line)" level depending upon the modulation signal which is the mark or the space, except for minute pulse portions. In this embodiment, the signal $I_2Q_2$ is fed to the pulse generator 324 (326) which has the construction shown in FIG. 3, so as to produce a pulse sigal $DI_2Q_2$, while a D-type flip-flop 98 samples the signal X clocked by the pulse signal $DI_2Q_2$. As shown in FIG. 10, the pulses $DI_2Q_2$ are each developed in between the successive minute pulse portions of the signal X and, therefore, free from the influence of the minute pulse portions.

In the second and third embodiments described above, it should be noted that the 45° of phase difference between the signals $I_1$, $Q_1$, $I_2$ and $Q_2$ is not limitative and any other suitable angle other than zero may be selected, as will readily be seen by drawing such waveforms as those of FIG. 10.

Further, the number of the base band signals is not limited to four and may be increased to $4 \times N$ (positive integer) without effecting the operation, as can also be confirmed. For example, assume eight baseband signals which have relative phases of 0°, 22.5°, 45°, 67.5°, 90°, 112.5°, 135° and 157.5°. Then, assuming that the signals with the phases 0°, 45°, 90° and 135° belong to a first group and the others to a second group, transition times of the signals in the second group each intervene between those of the signals in the first group. Further, assuming that the signals with the phases of 0° and 90° in the second group constitute a third group and those with the phases 45° and 135°, a fourth group, a reference signal can be generated by a set-reset circuit which is reset by transition points of the signals in the third signal group. When the reference signal is applied to an Ex-OR gate together with a signal which has been provided by applying all the signals in the first group to an Ex-OR, the signal X as shown in FIG. 10 will be produced.

Where the signals in the second group are coupled to an Ex-OR gate and, then, to such a pulse generator as one shown in FIG. 3, the resulting sampling pulses each appear at a time intermediate between successive transition points of the first signal group, that is, avoiding the minute pulse portions of the signal X. The signal X can therefore be sampled by a sampling circuit using the sampling pulses.

The gist is that the signals to be grouped are arranged in the order of the phase. However, where the phase difference exceeds 180°, the signals have to be arranged in the modulo 180° order. Again, such will readily be understood by drawing waveforms.

In summary, it will be seen that the present invention provides an FM demodulator which is attainable as an integrated circuit with ease since all the circuit elements succeeding mixers are operable in the baseband and those succeeding limiters are implemented by digital circuit elements. The arrangement succeding the baseband circuit may be implemented by once digitizing the signals and, then, effecting signal processing in acordance with the present invention by means of a microprocessor or the like.

Various modifications will become possible for those skilled in the art after receiving the teachings of the present disclosure without departing from the scope thereof.

What is claimed is:

1. An FM demodulator comprising:
   frequency down converter means for converting a received frequency-modulated signal, by use of local oscillator signals having a frequency which is substantially equal to a center frequency of the modulated signal for providing 2N (which N is a positive integer) baseband signals which are different in phase from each other;
   limiter means for digitizing the 2N baseband signals to provide 2N digital signals of two ligical levels;
   a first Exclusive-OR gate for providing an Exclusive-OR of the 2N digital signals to produce a first gate signal;
   reference signal generator means for generating a reference signal where the 2N digital signals are arranged in phase and in a modulo 180° order, every second signal of the 2N signals belonging to a first group and the other of said signals belonging to a second signal group, said reference signal generating means selecting one of logical levels "1" and "0" each time that a state of any of the signals in the first signal group is changed and selecting the other logical level each time that a state of any of the signals in the second signal group is changed;
   a second Exclusive-OR gate responsive to the reference signal and to the first gate signal of the first Exclusive-OR gate for producing a second gate signal;
   pulse generator means responsive to one of said second gate signal and the reference signal as an input signal for generating a pulse signal in response to a state transition of the input signal, said pulse signal being generated a predetermined period before or after a time of the state transition; and
   a D-type flip-flop responsive to the generated pulse signal as a clock pulse input and to the second gate signal as a signal input, an output of said D-type flip-flop being delivered as a demodulated output signal.

2. An FM demodulator as claimed in claim 1, further comprising low-pass filter means for separating only one of the baseband signals which lies in a desired channel while band-limiting noise.

3. An FM demodulator as claimed in claim 1, wherein the frequency down converter means comprises local oscillator means for generating an output signal whose frequency is substantially equal to a center frequency of the modulated signal, phase shifter means for generating an output signal by shifting a phase of the output signal of said local oscillator means by a predetermined amount, and mixer means for generating the baseband signals in response to output signals of the local oscillator means and phase shifter means and the modulated signal.

4. An FM demodulator as claimed in claim 3, wherein the predetermined amount is 90°.

5. An FM demodulator comprising:
   frequency down converter means for converting a received frequency-modulated signal, by a use of local oscillator signals having a frequency which is substantially equal to a center frequency of the modulated signal for providing two baseband signals which are different in phase from each other;
   limiter means for digitizing the two baseband signals to provide two digital signals of two logical levels;
   a first Exclusive-OR gate for providing an Exclusive-OR of the two digital signals to produce a first gate signal;
   reference signal generator means responsive to the two digital signals for generating a reference signal by selecting one of logical levels "1" and "0" each time that a state of one of the two digital signals is changed and by selecting the other logical level each time that a state of the other digital signal is changed;
   a second Exclusive-OR gate responsive to the reference signal and to the first gate signal to produce a second gate signal;

pulse generator means responsive to one of the second gate signal and the reference signal as an input signal for generating a pulse signal in response to a state transition of the input signal, said pulse signal being generated a predetermined period before or after a time of the state transition; and a D-type flip-flop responsive to the pulse signal as a clock pulse input and to the second gate signal as a signal input, an output of the D-type flip-flop being delivered as a demodulated output signal.

6. An FM demodulator comprising:
frequency down converter means for converting a received frequency-modulated signal, by a use of local oscillator signals having a frequency which is substantially equal to a center frequency of the modulated signal for providing 4N (where N is a positive integer) baseband signals which are different in phase from each other:
limiter means for digitizing the 4N baseband signals to provide 4N digital signals of two logical levels;
every two signals of the 4N digital signals belong to a first signal group and the others to a second signal group when ditigal signals are arranged in phase and in a modulo 180° order, every two signals of the first signal group belonging to a third signal group and the others to a fourth signal group;
a first Exclusive-OR gate responsive to all of the signals belonging to the first signal group to produce a first gate signal;
a second Exclusive-OR gate responsive to all the signals belonging to the second signal group to produce a second gate signal;
reference signal generator means for generating a reference signal by selecting one logical state of a digital signal every time a state of any of the signals in the third signal group is changed and by selecting the other of the logical states every time a state of any of the signals in the fourth signal group is changed;
a third Exclusive-OR gate responsive to the reference signal and to the first gate signal to produce a third gate signal; and
sampling means for sampling said third gate signal every time a state of any of the signals in the second signal group is changed, an output of said sampling means being delivered as a demodulated output signal.

7. An FM demodulator as claimed in claim 6, further comprising low-pass filter means for separating only one of the baseband signals which lies in a desired channel while band-limiting noise.

8. An FM demodulator as claimed in claim 6, wherein the frequency down converter means comprises local oscillator means for generating an output signal whose frequency is substantially equal to a center frequency of the modulated signal, phase splitter means responsive to the output signal of said local oscillator means for generating 4N output signals having predetermined phase differences relative to the output signal of the local oscillator means, and mixer means responsive to the output signal of said phase splitter means and the modulated signal for generating the 4N baseband signals.

9. An FM demodulator comprising:
frequency down converter means for converting a received frequency-modulated signal, by a use of local oscillatomprising:
frequency down converter means for converting a received frequency-modulated signal, by a use of local oscillator signals having a frequency which is substantially equal to a center frequency of the modulated signal for providing four baseband signals which are different in phase from one another;
limiter means for digitizing the four baseband signals to provide four digital signals of two logical levels;
a first Exclusive-OR gate for providing an Exclusive-OR of the four digital signals to produce a first gate signal;
reference signal generator means responsive to the four digital signals for generating a reference signal by selecting one of logical levels "1" and "0" every time that states of two of the four digital signals are changed and by selecting the other logical level every time that states of the other two digital signals are changed;
a second Exclusive-OR gate responsive to the first gate signal and the reference signal to produce a second gate signal; and
sampling means for sampling the second gate signal to produce a demodulated output signal.

10. An FM demodulator comprising:
frequency down converter means for converting a received frequency-modulated signal, by a use of local oscillator signals having a frequency which is substantially equal to a center frequency of the modulated signal for providing four baseband signals which are different in phase from one another:
limiter means for digitizing the four baseband signals to provide four digital signals of two logical levels;
a first Exclusive-OR gate for providing an Exclusive-OR of two of the four digital signals to produce a first gate signal;
a second Exclusive-OR gate for providing an Exclusive-OR of the other two digital signals to produce a second gate signal;
reference signal generator means responsive to the other two digital signals for generating a reference signal by selecting one of logical levels "1" and "0" every time that states of one of the other two digital signals is changed and by selecting the other logical level every time a state of the other one of the other two digital signals is changed;
a third Exclusive-OR gate responsive to the reference signal and to the second gate signal to produce a third gate signal; and
sampling means for sampling said third gate signal every time a state of the first gate signal is changed, to produce a demodulated output signal.

* * * * *